(12) United States Patent
Hsieh et al.

(10) Patent No.: US 9,104,755 B2
(45) Date of Patent: Aug. 11, 2015

(54) ONTOLOGY ENHANCEMENT METHOD AND SYSTEM

(71) Applicant: NATIONAL TAIWAN UNIVERSITY, Taipei (TW)

(72) Inventors: Shang-Hsien Hsieh, Taipei (TW); Yu-Huei Jin, Taipei (TW)

(73) Assignee: NATIONAL TAIWAN UNIVERSITY, Taipei (TW)

( * ) Notice: Subject to any disclaimer, the term of this patent is extended or adjusted under 35 U.S.C. 154(b) by 210 days.

(21) Appl. No.: 13/906,941

(22) Filed: May 31, 2013

(65) Prior Publication Data
US 2014/0164432 A1 Jun. 12, 2014

(30) Foreign Application Priority Data
Dec. 7, 2012 (TW) .............................. 101146124 A

(51) Int. Cl.
G06F 17/30 (2006.01)

(52) U.S. Cl.
CPC ................................ G06F 17/30734 (2013.01)

(58) Field of Classification Search
USPC ........................................ 707/5, 723; 706/12
See application file for complete search history.

(56) References Cited

U.S. PATENT DOCUMENTS

| 8,903,811 | B2* | 12/2014 | Hueter et al. | 707/723 |
| 2009/0222444 | A1* | 9/2009 | Chowdhury et al. | 707/5 |
| 2011/0258152 | A1* | 10/2011 | Wang et al. | 706/12 |

OTHER PUBLICATIONS

Hsien-Tang Lin, "An Ontology-based Passage Retrieval Method and Application for Domain-Specific Documents", Doctoral Dissertation, Department of Civil Engineering College of Engineering, National Taiwan University, Jul. 2009.
Jiang, "A Knowledge-based Chinese Query Expansion System", Master's Thesis, National Central University, Taiwan, Jul. 2009.
Chia-Hsueh Li, "Semantic Web Service Discovery Using Ontology and Lexical Analysis", Master's Thesis, College of Electrical Engineering and Computer Science, National Taiwan Ocean University, Jul. 2011.

* cited by examiner

*Primary Examiner* — Etienne Leroux
(74) *Attorney, Agent, or Firm* — Li & Cai Intellectual Property (USA) Office

(57) ABSTRACT

An exemplary embodiment of the present disclosure provides an ontology enhancement method. Firstly, at least an input information request is received. Then, based on an ontology, each input information request is expanded to produce at least an expanded information request of each corresponding input information request. Based on a searching model, according to each expanded information request, a file collection is searched to obtain searching results of each corresponding expanded information request. Then, according to each searching result, a plurality of candidate knowledge concepts of each corresponding searching result are extracted. Next, the candidate knowledge concepts of each searching result are selectively added into the ontology.

18 Claims, 12 Drawing Sheets

| rank \ knowledge concept | 敷地計畫 | 工程分析 | 工地規劃與利用 | 規劃與設計 | 施工 |
|---|---|---|---|---|---|
| 1 | 建築資訊模型 | 建築資訊模型 | 建築資訊模型 | 建築資訊模型 | 建築資訊模型 |
| 2 | 植栽 | 進度 | 進度 | 團隊 | 介面溝通 |
| 3 | 銷售 | 專業分包商 | 專業分包商 | 領域團隊 | 專業分包商 |
| 4 | 建築 | 甘特圖 | 甘特圖 | 專業分包商 | 施工介面 |
| 5 | 購屋者 | 模型 | 模型 | 跨領域 | WBBIMS |
| 6 | 景觀 | WBBIMS | WBBIMS | WBBIMS | 更新 |
| 7 | 視覺運算 | 更新 | 更新 | 更新 | 更新資 |
| 8 | 彩現 | 更新資 | 更新資 | 3D | 施工介面溝通 |
| 9 | 現時間 | 工程進度 | 工程進度 | 階段成本占設計總成 | 構件 |
| 10 | Revit | 更新資訊 | 更新資訊 | 段成本占設計總成 | 介面管理 |

FIG. 9

ONTOLOGY ENHANCEMENT METHOD AND SYSTEM

BACKGROUND

1. Technical Field

The present disclosure relates to a data enhancement method and system thereof, in particular, to an ontology enhancement method and system thereof.

2. Description of Related Art

With the approach of the current information era, the amount of the information is rapidly increasing every day. If there are no appropriate methods for managing the information well, the knowledge contained in the information cannot be rapidly utilized by the user. Regardless of specific fields of any kinds, the ontology can be utilized to categorize knowledge concepts of the specific filed.

The ontology is a manner for presenting the knowledge concepts, and is widely used in several specific fields. The ontology concisely presents the knowledge concepts included in the specific field and the relationship among the knowledge concepts. Currently, during the process for establishing the ontology, there are no unified standards and methods. In the process for establishing the ontology, a plurality of experts of the specific fields must join, and with the development of the specific filed knowledge, the content of the ontology should be modified or further enhanced. Thus, it cost exhaustive time and human labor for developing the ontology.

SUMMARY

To reduce the cost of time and human labor for establishing an ontology of a specific field, exemplary embodiments of the present disclosure provide an ontology enhancement method and system thereof which use the information querying technology.

An exemplary embodiment of the present disclosure provides an ontology enhancement method. Firstly, at least an input information request is received. Then, based on an ontology, each input information request is expanded to produce at least an expanded information request of each corresponding input information request. Based on a searching model, according to each expanded information request, a file collection is searched to obtain searching results of each corresponding expanded information request. Then, according to each searching result, a plurality of candidate knowledge concepts of each corresponding searching result are extracted. Next, the candidate knowledge concepts of each searching result are selectively added into the ontology.

An exemplary embodiment of the present disclosure provides an ontology enhancement system comprising a server. The server comprises an information request expanding module, an information searching module, and an enhancement module. Based on an ontology, the information request expanding module expands each input information request to produce at least an expanded information request of each corresponding input information request. Based on a searching model, according to each expanded information request, the information searching module searches a file collection to obtain searching results of each corresponding expanding information request, and according to each searching result, the information searching module extracts a plurality of candidate knowledge concepts of each corresponding searching result. The enhancement module selectively adds the candidate knowledge concepts of each searching result into the ontology.

To sum up, the ontology enhancement method provided by an exemplary embodiment of the present disclosure can expand input information request input by the user based on the knowledge concepts of the ontology, and utilize the information querying technology to obtain the required enhanced knowledge concepts fast and accurately. Thus, the ontology enhancement method and system thereof can reduce the cost of time and human labor when the ontology of the specific field is established.

In order to further understand the techniques, means and effects of the present disclosure, the following detailed descriptions and appended drawings are hereby referred, such that, through which, the purposes, features and aspects of the present disclosure can be thoroughly and concretely appreciated; however, the appended drawings are merely provided for reference and illustration, without any intention to be used for limiting the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

FIG. 9 is a schematic diagram showing the ranks of keywords associated with the knowledge concepts in Chinese according to an exemplary embodiment of the present disclosure.

DESCRIPTION OF THE EXEMPLARY EMBODIMENTS

To reduce the cost of time and human labor for establishing an ontology of a specific field, exemplary embodiments of the present disclosure provide an ontology enhancement method and system thereof which use the information querying technology. The ontology enhancement method can expand the information request according to the ontology, and utilize the information querying technology to search a file collection according to the expanded information request, so as to obtain searching results. Next, according to each searching result, candidate knowledge concepts of each corresponding searching result are extracted. Then, the candidate knowledge concepts are selectively added into the ontology. To describe the concepts of the present disclosure definite, the following exemplary embodiments which can be carried out are illustrated.

Figure 1:
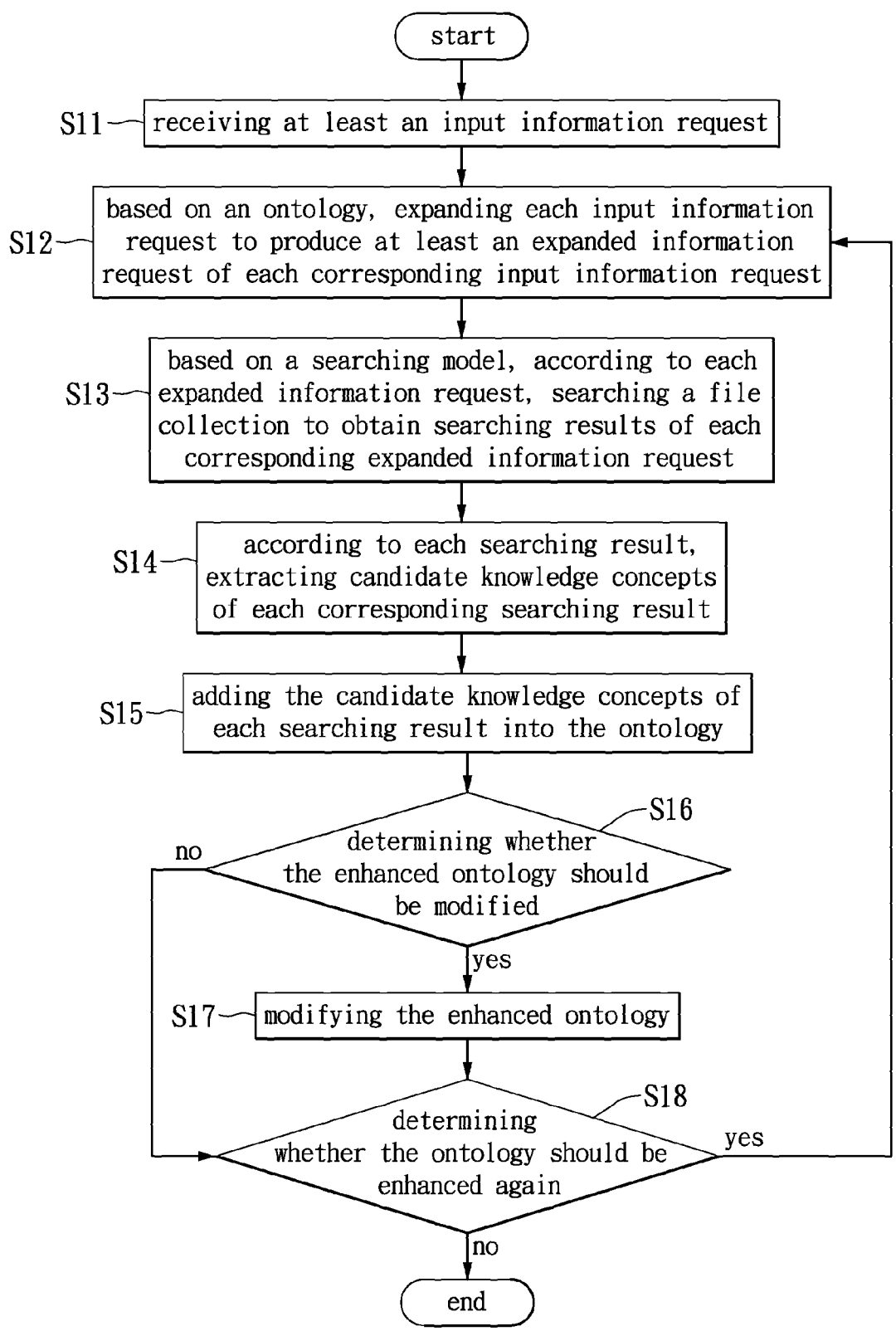
FIG. 1 is a flow chart of an ontology enhancement method according to an exemplary embodiment of the present disclosure.

FIG. 1 is a flow chart of an ontology enhancement method according to an exemplary embodiment of the present disclosure. In the exemplary embodiment, the input information request and the expanded information request can be query phrases of phrase querying search. When the user operates the information searching system, the user can use the simple phrase query to present his or her input information request, such that the current ontology can be enhanced according to the input information request. In addition, the ontology enhancement method can be executed by an electronic apparatus with computing ability (such as a server), but the present disclosure is not limited thereto. Moreover, the types of the input information request and the expanded information request are not used to limit the present disclosure, and information of other types, such as the image, the pattern, and the sound can be served as the input information request and the expanded information request in the exemplary embodiment of the present disclosure.

Firstly, at step S11, the server receives at least an input information request. It is noted that the user can use the user terminal to input the input information request, and the user terminal can be linked to the server through the network, such that the input information request can be transmitted to the server, or alternatively, the user can directly input the input information request into the server. In short, the generation of the input information request is not used to limit the present disclosure.

Next, at step S12, based on an ontology, the server expands each input information request to produce at least an expanded information request of each corresponding input information request. Based on the input information request, the server lookups knowledge concepts in the ontology which are related to the input information request to expand the input information request, thus the expanded information request is produced, and the related details are described in the later descriptions. It is noted that the ontology can be stored in the database of the server, or alternatively the server can acquire the ontology from the database of the external storage device linked to the server. In short, the storing position of the ontology is not used to limit the present disclosure.

Next, at step S13, based on a searching model, according to each expanded information request, the server searches a file collection to obtain searching results of each corresponding expanded information request. The file collection contains collected documents of the specific field, and is provided to the server to search. The server calculates the relation between the information request and the file collection, so as to find documents more matching to the expanded information request, and then the server ranks the searched documents according to the relation levels between the searched documents and the expanded information request, so as to generate the searching results of the expanded information request. It is noted that storing position of the file collection is also not used to limit the present disclosure, and the file collection can be stored in the database of the server or the database of external storage device. In addition, the searching model can be a vector space searching model, but the present disclosure is not limited thereto.

Next, at step S14, according to each searching result, the server extracts candidate knowledge concepts of each corresponding searching result. The candidate knowledge concepts are keywords extracted from the searched documents of the searching result when the knowledge concepts are served as the expanded information request. It is noted that a segmentation method (such an n-gram segmentation method) is utilized to extract the several top high rank keywords as the candidate knowledge concepts of the corresponding expanded information request from the documents of the searching result.

At step S15, the server selectively adds the candidate knowledge concepts of each searching result into the ontology. Briefly, the candidate knowledge concepts of the expanding information requests may be repetitive or have been added into the ontology, and thus server selectively adds the candidate knowledge concepts into the ontology according to a specific selection manner. Additionally, one implementation of the above specific selection manner is illustrated in the later description accompanied with FIG. 8, but it is noted that the specific selection manner is not used to limit the present disclosure.

Then, at step S16, the server determines whether the enhanced ontology should be modified. If the server determines that the enhanced ontology should be modified, step S17 is executed; otherwise, step S18 is executed. The server can provide a user interface to the user, such that the user can feedback the information in light of the result of the enhanced ontology. Through the feedback information of the user in light of the candidate knowledge concepts of the enhanced ontology every time, the statements and positions of the candidate knowledge concepts in the enhanced ontology are ensured being appropriate.

At step S17, the server modifies the enhanced ontology. If the statements or positions of the candidate knowledge concepts in the enhanced ontology are not appropriate, the user can feedback the information of recommended revise via the user interface, and the server can modify the enhanced ontology according to the recommended revise. If the statements and positions of the candidate knowledge concepts in the enhanced ontology are appropriate, step S18 is executed. However, it is noted that the existence and implementation of steps S16 and S17 are not used to limit the present disclosure.

For example, step S17 can be changed to that the server simply discards the enhanced ontology this time.

Next, at step S18, the server determines whether the ontology should be enhanced again. If the server determines that the ontology should be enhanced again, step S12 will be executed again; otherwise, the server terminates the ontology enhancement method, and generates the ontology of the specific field. The server can provide the user interface to the user, and via the user interface, the user can evaluate that the enhanced ontology is complete enough to represent the specific field, so as to determine whether the ontology should be enhanced again. If the ontology should be enhanced again, steps S12 through S15 will be executed again, and the current enhanced ontology is used in the next ontology enhancement process.

It is noted that the quantity of the user participating in feedback can be plurality, and the user can be a general user or a specific field expert, and different weighting values are assigned to the general user and the specific field expert. The server adds the feedback weighting values from the user, and determines whether the total feedback weighting value is larger than a threshold value, wherein the threshold value is determined according to the quantity of the users. If the total feedback weighting value is larger than the threshold value, the server will modify or enhance the ontology again; otherwise, the server will not modify or enhance the ontology again.

Figure 2:
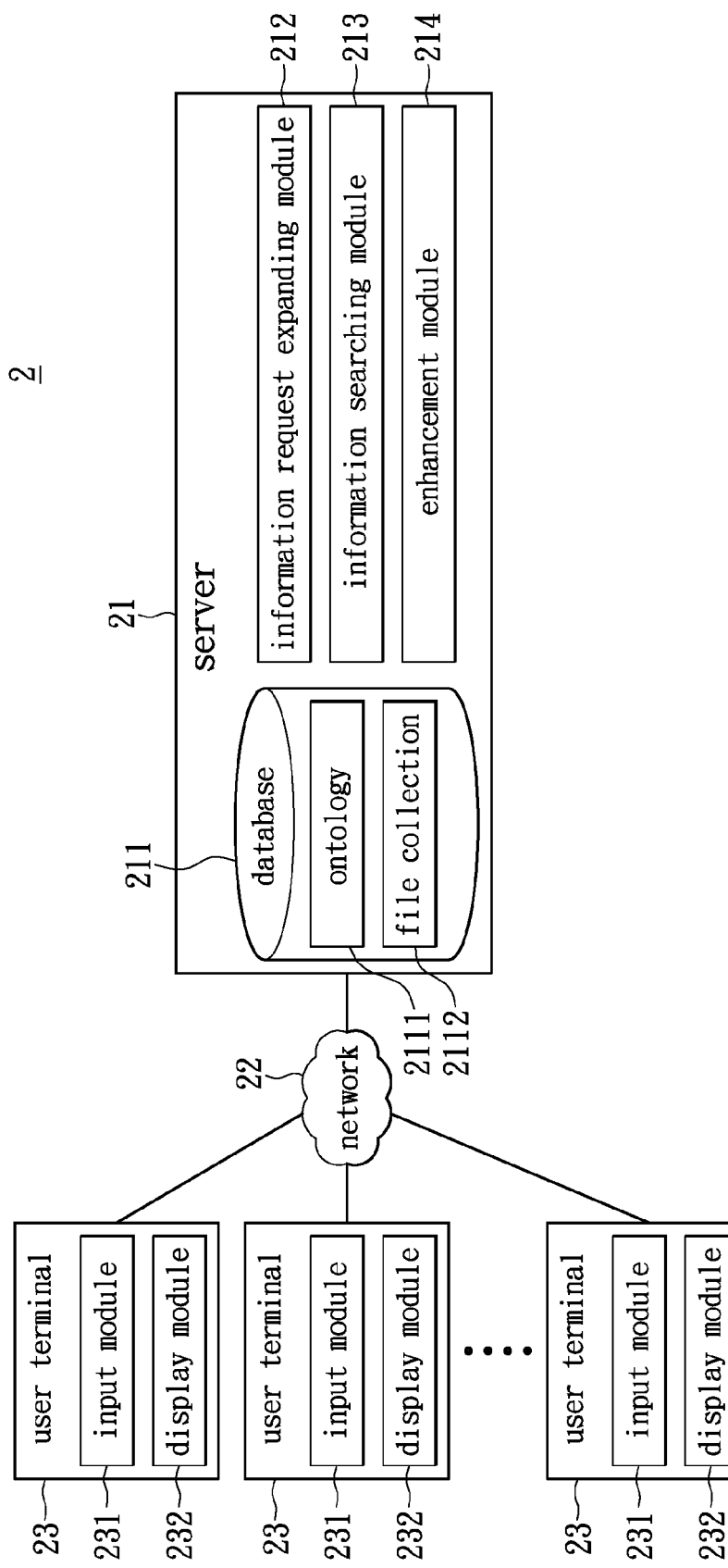
FIG. 2 is a schematic diagram of an ontology enhancement system according to an exemplary embodiment of the present disclosure.

Referring to FIG. 2, FIG. 2 is a schematic diagram of an ontology enhancement system according to an exemplary embodiment of the present disclosure. In the exemplary embodiment, the ontology enhancement system 2 at least comprises a user terminal 23 and a server 21. The server 21 is linked to the user terminal 23 via the network 22, or directly linked to the user terminal 23. As mentioned above, in the other exemplary embodiment, the user can directly input the input information request to the server 21, and thus the user terminal 23 is not the required component of the ontology enhancement system 2. In short, the quantity and existence of the user terminal 23 are not used to limit the present disclosure.

The user terminal 23 comprises an input module 231. The input module 231 provides the user to input the input information request, and receives the feedback weighting value from the user, wherein the feedback weighting value is used to determine whether the enhanced ontology should be modified or enhanced again. The display module 232 displays the user interface provided by the user interface, and the user interface provides the user to know the enhanced ontology.

The server 21 comprises a database 211, an information request expanding module 212, an information searching module 213, and an enhancement module 214. The database 211 stores the ontology 2111 and the file collection 2112. As mentioned above, the database 211 can be removed, and the ontology 2111 and the file collection 2112 can be stored in the database of the external storage device. Even, the ontology 2111 and the file collection 2112 can respectively stored in the database 211 and the database of the external storage device. In short, the storing position of the ontology 2111 and the file collection 2112 are not used to limit the present disclosure.

The information request expanding module 212 can expand each input information request based upon the ontology 2111 to generate at least an expanding information request of each input information request. Based upon a searching model, the information searching module 213 searches the file collection 2112 according to each expanding information request based to obtain the searching result of each expanding information request. Next, the information searching module 213 further extracts corresponding candidate knowledge concepts of each searching result according to each searching result.

The enhancement module 214 selectively adds candidate knowledge concepts of each searching result into the ontology 2111. Additionally, the enhancement module 214 further determines whether the enhanced ontology 2111 should be modified, and whether the ontology 2111 should be enhanced again. If that the enhanced ontology 2111 should be modified or further enhanced is determined, the enhancement module 214 modifies the enhanced ontology 2111, or indicates the information request expanding module 212 to expand each input information request based upon on the enhanced ontology 2111 to generate at least an expanding information request of each input information request, such that the ontology 2111 is enhanced again. Until the completeness of the enhanced ontology 2111 meets the requirement, the ontology enhancement system 2 continuously enhances the ontology 2111.

In the exemplary embodiment of the present disclosure, the ontology 2111 can be for example the ontology of the building information modeling or the head symptom. It is noted that the specific filed of the ontology 2111 is not used to limit the present disclosure.

Figure 3:
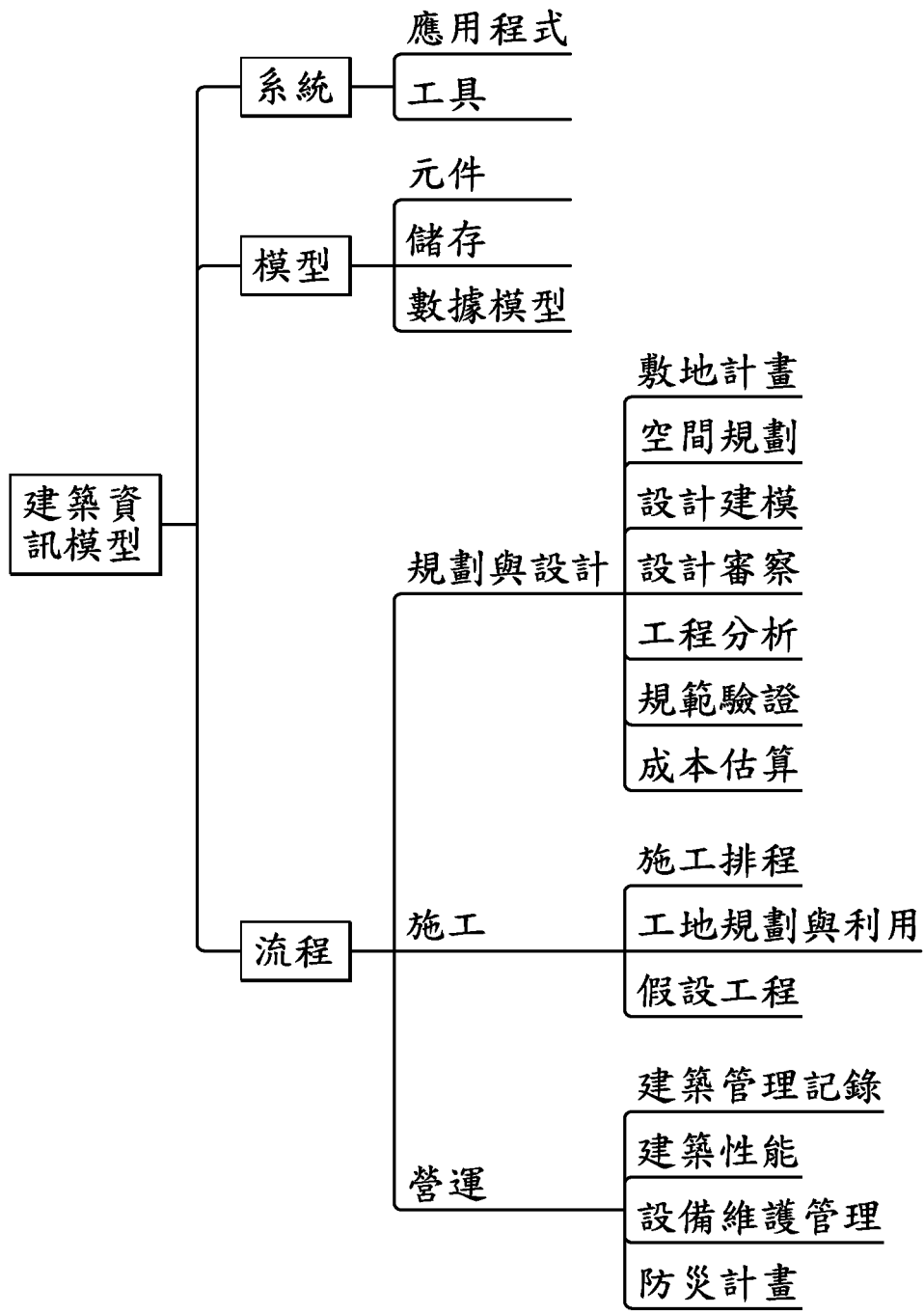
FIG. 3 is schematic diagram showing an ontology of a building information modeling in Chinese according to an exemplary embodiment of the present disclosure.

Referring to FIG. 3, FIG. 3 is schematic diagram showing an ontology of a building information modeling in Chinese according to an exemplary embodiment of the present disclosure. It is noted that the following exemplary embodiment uses the ontology of the building information modeling in Chinese for example, but the present disclosure is not limited thereto. The ontology is built by knowledge concepts, wherein the knowledge concepts are obtained by summarizing and analyzing file data relative to the building information modeling, and these knowledge concepts are used to form the ontology of the building information modeling.

If the user wants to enhance the ontology in FIG. 3, and inputs the Chinese terms "建築資訊模型" (the term in English is "building information modeling") and "營運" (the term in English is "operation") as the query phrases of the input information request, the ontology enhancement method or system will consider that the user want to search the files related to "營運" (the term in English is "operation") in "建築資訊模型" (the term in English is "building information modeling") field.

According to the above ontology enhancement method, the knowledge concepts related to "營運" (the term in English is "operation") in the ontology are searched, and the input information request is expanded accordingly to generate the expanding information request. In the exemplary embodiment, the knowledge concepts related to "營運" (the term in English is "operation") under the level of "營運" (the term in English is "operation") are selected as some of the expanding information requests, and thus the expanding information requests can have more information. In other words, the expanding information requests are query phrases associated with the knowledge concepts of "建築管理記錄" (the term in English is "building management records"), "建築性能" (the term in English is "building performance"), "設備維護管理" (the term in English is "equipment maintenance management"), and "營運" (the term in English is "operation").

Due to that the relations of the knowledge concepts at different levels in the ontology and the knowledge concept of "營運" (the term in English is "operation") are not identical to each other, thus the knowledge concepts selected as the expanding information requests may have different weighting coefficients based upon the structure of the ontology in FIG. 3. In the exemplary embodiment of the present disclosure, the weighting coefficients assignment manner assigns the weighting coefficients to the knowledge concepts at the inferior levels associated with the level of the input information request input by the user. However, it is noted that the weighting coefficients assignment manner is not used to limit the present disclosure.

Figure 5:
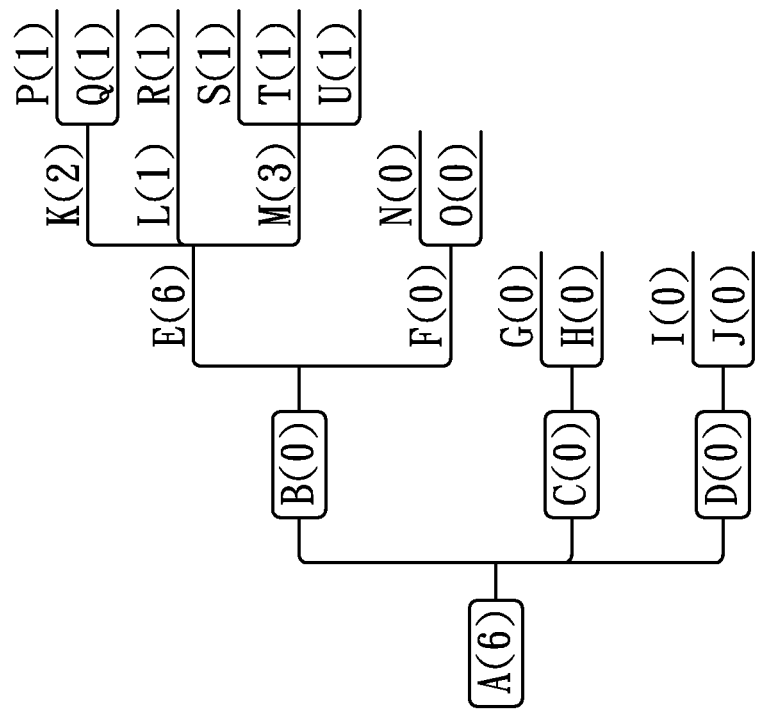
FIG. 5 is a schematic diagram illustrating that weighting values are assigned to knowledge concepts in an ontology in response to the input information request according to an exemplary embodiment of the present disclosure.
Figure 4:
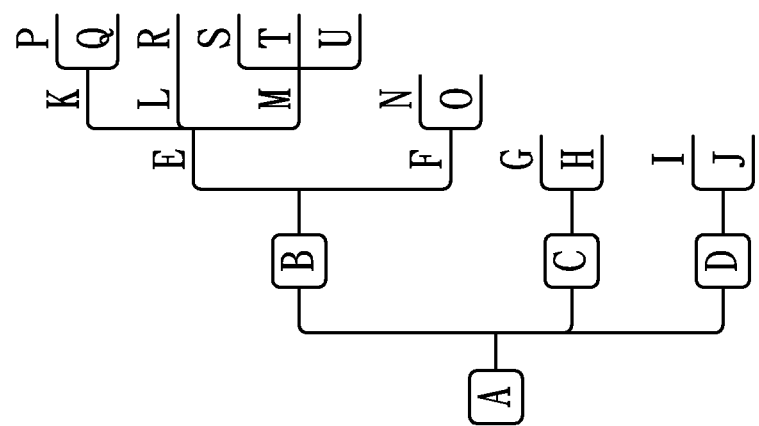
FIG. 4 is a schematic diagram showing an ontology according to an exemplary embodiment of the present disclosure.

Referring to FIG. 4 and FIG. 5, FIG. 4 is a schematic diagram showing an ontology according to an exemplary embodiment of the present disclosure, and FIG. 5 is a schematic diagram illustrating that weighting values are assigned to knowledge concepts in an ontology in response to the input information request according to an exemplary embodiment of the present disclosure. When the structure of the ontology is shown as FIG. 4, each node represents of a knowledge concept, and the input information request input by the user represented by the node E, the weighting coefficients assignment manner searches the nodes without any children node under the level of the node E. In the exemplary embodiment, the nodes without any children node are nodes P, Q, R, S, T, and U. The more children nodes the node has, the more knowledge concepts the node has, and the more important the node is. Thus, the nodes without any children node are initialized to have weighting coefficients of 1. Next, the weighting coefficients of the nodes are accumulated to their father node.

For example, node M is the father node of the nodes S, T, and U, and thus the weighting coefficient of the node M is 3. By the similar manner, the weighting coefficient of the node K is 2, and the weighting coefficient of the node L is 1. Next, the weighting coefficients of the nodes K, L, and M are accumulated to their father node E, thus the weighting coefficient of the node E is 6, and the weighting coefficients of the other nodes are 0 (as shown in FIG. 5).

After obtaining the weighting map of the node E, another input information request, "建築資訊模型" (the term in English is "building information modeling"), input by the user is considered. Since the input information requests of " 建築資訊模型 " (the term in English is "building information modeling") and the node E are input by the user, both of the input information requests have the identical importance. Thus, the weighting coefficient of the node E is assigned to the node of " 建築資訊模型 " (the term in English is "building information modeling"), i.e. the weighting coefficient of the node E is the same as weighting coefficient of " 建築資訊模型 " (the term in English is "building information modeling"). Because " 建築資訊模型 " (the term in English is "building information modeling") is the most top knowledge concept of the ontology of the building information modeling, the knowledge concept of node A in the exemplary embodiment of FIG. 4 is " 建築資訊模型 " (the term in English is "building information modeling").

Therefore, the weighting coefficient of the node E is assigned to node A, i.e. the weighting coefficient of the node A is 6. To make each input information request have the identical importance, the weighting map is normalized, such that the total weighting coefficient of the weighting map is 1, to maintain each input information request to have the identical importance.

According to the above steps, the input information request of the user can be expanded based upon the ontology to generate expanding information request. The expanding information request (comprising weighting coefficients and knowledge concepts) in the exemplary embodiment of the present disclosure can be converted to the information request vector of the vector space model, and according to relation evaluation manner of the vector space model, the searching result corresponding to the expanding information request is obtained.

The searching model in the exemplary embodiment of the present disclosure can be established by the vector space model. The vector space model is a general searching model in the information querying technology, wherein the files in the file collection and the expanding information request are converted to be vectors. In the vector space, the smaller the angle between the two vectors is, the more similar the two vectors are. Thus, the relation between the file and the expanding information request can be obtained via their converted vectors.

The manner for converting the file to be the vector is to give a weighting coefficient to each phrase in the file to represent each phrase in the file in one dimension, wherein the weighting coefficient of the phrase is calculated by a term frequency-inverse document frequency manner. The more the target phrase occurs in one file, the higher the term frequency of the phrase is. The less the target phrase never occurs in most files, the inverse document frequency of the phrase is smaller. In other words, the product of the term frequency and inverse document frequency associated with the phrase is the weighting coefficient of one dimension of the file vector. After calculating weighting coefficient of each phrase, the weighting coefficients of the dimensions form the vector of the file. When the expanding information request is generated, a vector of the expanding information request can be formed by the similar manner. Next, the vector inner product between two vectors is used to calculate the relation between the file and the expanding information request.

In the vector space model, the smaller the angle between two vectors is, the higher the relation between the information request and the file is. Thus, the inner vector product is used. The higher the inner vector product is, the higher the relation is. Via using the vector space model, the files in the file collection can be sorted according to the relations between the files and expanding information request, so as to obtain the searching result of the expanding information request.

The searching result has the information of the rank of the files related to the expanding information request. The higher the rank the file in the searching result is, the more similar the file and the expanding information request are. Thus, the file with higher rank in the searching result is the file with the higher relation to the knowledge concept in the ontology. In the exemplary embodiment of the present disclosure, the files with top three relations can be selected as the searching result of the expanding information request.

To enhance the content of the ontology, the ontology enhancement method merely analyzes several files having the higher relations within top ranks. There are several knowledge concepts in the same file, and in addition to the knowledge concepts related to the expanding information request, the file may have the other knowledge concepts. The knowledge concept and the knowledge concept in the expanding information request may occur in the same file, and this means the two knowledge concepts have the higher relation. Thus, the knowledge concepts should be added into the ontology. Via the knowledge concepts in the files which have the higher relations within top ranks, the knowledge concepts of the ontology are enhanced.

After obtaining the searching result of one expanding information request, candidate knowledge concepts are extracted from the files having the higher relations within top ranks. For the file in Chinese, the phrases in the file represent the knowledge concepts included in the file. To extract the knowledge concepts in each file, the sentences in the file are analyzed. The sentence analysis is to segment the sentence to the phrases, and is also called phrase segmentation method in the information querying technology.

The phrase segmentation method can let the sentence of the content in the file be stored as several units according to the correct syntax, and the unit is the phrase. Since the rules for using the phrases to form the sentence in different languages are not the same, and thus the manners to segment the sentence according to the correct syntax in different languages are not the same.

In the exemplary embodiment of the present disclosure, the n-gram segmentation method is used to analyze the file, and the pros is that the phrase dictionary should not be established in advance, and the content of the file is directly analyzed to extract the phrases frequently occurring in the file. Thus, when the n-gram segmentation method is used to extract the phrases of the new developed specific field, the n-gram segmentation method can segment the sentence of the content in the file, even the phrases of the new developed specific field are not cataloged in the dictionary. It is noted that n-gram segmentation method is widely used for languages of west Asia, such as Chinese, Japanese, Korean, and the n-gram segmentation method is not the only one method to extract the phrases. For languages of European or other countries, the other segmentation methods to extract the phrases may be used.

The n-gram segmentation method is assumed that the sentence has a smallest representation unit. In Chinese, the smallest representation unit is a word. Each smallest representation unit and another smallest representation can form a concept, and that is Chinese phrase. The n-gram segmentation method does not limit the number which the smallest representation units are used to form a concept. If the n-gram segmentation method only uses one smallest representation unit, it is called unigram segmentation method. If the n-gram segmentation method only uses two smallest representation units, it is called bigram segmentation method. If the n-gram segmentation method only uses three smallest representation units, it is called trigram segmentation method.

Figure 7:
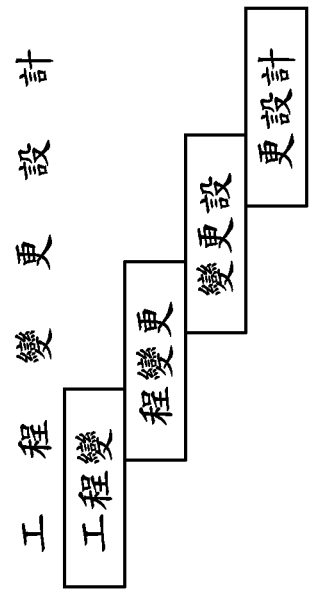
FIG. 7 is a schematic diagram illustrating the Chinese term "工程變更設計" (the term in English is "engineering design change") is segmented by a trigram segmentation according to an exemplary embodiment of the present disclosure.
Figure 6:
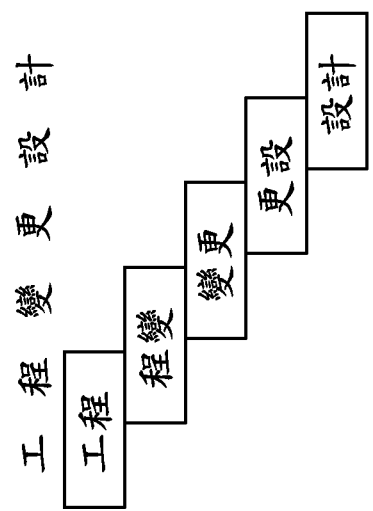
FIG. 6 is a schematic diagram illustrating the Chinese term "工程變更設計" (the term in English is "engineering design change") is segmented by a bigram segmentation according to an exemplary embodiment of the present disclosure.

In practice, while using the n-gram segmentation method, the number which the smallest units are used to form the concept is determined according to the property of the language and the contents of the file. Referring to FIG. 6 and FIG. 7, FIG. 6 is a schematic diagram illustrating the Chinese term "工 程變更設計" (the term in English is "engineering design change") is segmented by a bigram segmentation according to an exemplary embodiment of the present disclosure, and FIG. 7 is a schematic diagram illustrating the Chinese term "工程 變更設計" (the term in English is "engineering design change") is segmented by a trigram segmentation according to an exemplary embodiment of the present disclosure.

After performing the n-gram segmentation method on the sentence to divide the sentence into several phrases, to obtain the importance of the phrases, the term frequencies of the phrases are calculated. The term frequency is the frequency which the phrase occurs in the file, and the calculation manner is the occurring times of the phrase in the file divided by the total phrase number in the entire file.

The total phrase number in the file is calculated according to the segmentation length of the n-gram segmentation method. The dominator while calculating the term frequency of each phrase is the total phrase number with the segmentation length of the n-gram segmentation method. As shown in FIG. 6, based upon the Chinese term "工程變更設計" (the term in English is "engineering design change"), when calculating the term frequency of the phrase "工程" (the term in English is "engineering"), the dominator is 5, because the sentence is divided into 5 phrases by the segmentation length with two smallest units. As shown in FIG. 7, the dominator corresponding to the term frequency of the phrase "工程變" (the Chinese term cannot be presented in English since Chinese term does not have the complete syntax) is 4, because the sentence is divided into 4 phrases by the segmentation length with three smallest units. Thus, the longer the segmentation length of the phrase is, the less the dominator is, and the higher the term frequency of the phrase is, so as to show the importance of the long phrase.

Figure 8:
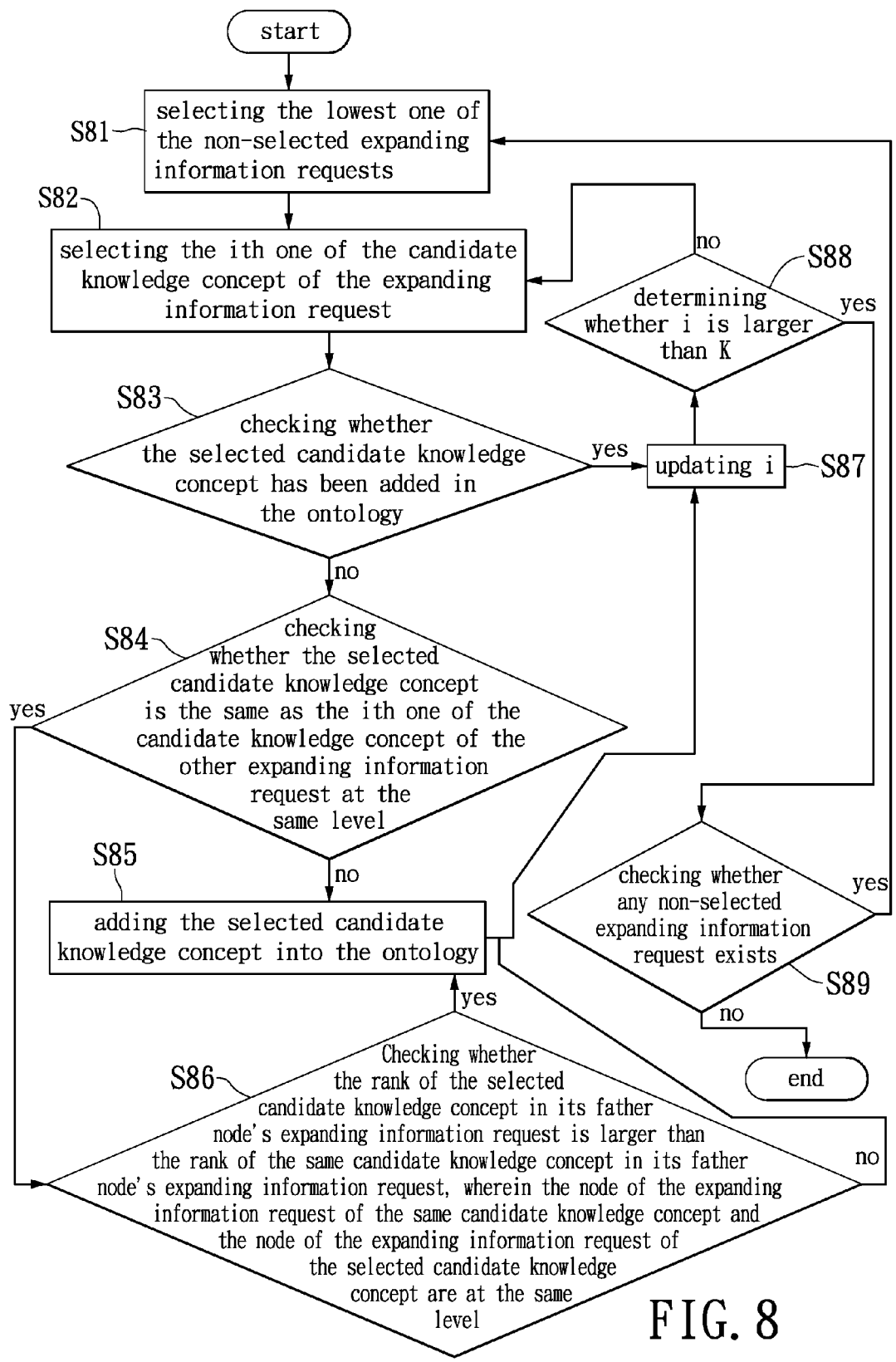
FIG. 8 is a flow chart of a method for selectively adding the candidate knowledge concepts of each searching result into the ontology according to an exemplary embodiment of the present disclosure.

Referring to FIG. 8, FIG. 8 is a flow chart of a method for selectively adding the candidate knowledge concepts of each searching result into the ontology according to an exemplary embodiment of the present disclosure. As shown in FIG. 8, at step S81, the lowest one of the non-selected expanding information requests is selected. Next, at step S82, the $i^{th}$ one (p.s. the initial value of i is 1) of the candidate knowledge concept of the expanding information request is selected. Next, at step S83, whether the selected candidate knowledge concept has been added in the ontology is checked. If the selected candidate knowledge concept is not added in the ontology, step S84 will be executed; otherwise, step S87 will be executed. At step S84, whether the selected candidate knowledge concept is the same as the $i^{th}$ one of the candidate knowledge concept of the other expanding information request at the same level is checked. If the selected candidate knowledge concept is not the same as the $i^{th}$ one of the candidate knowledge concept of the other expanding information request at the same level, step S85 will be executed; otherwise, step S86 will be executed.

At step S85, the selected candidate knowledge concept is added into the ontology. At step S86, whether the rank of the selected candidate knowledge concept in its father node's expanding information request is larger than the rank of the same candidate knowledge concept in its father node's expanding information request is checked, wherein the node of the expanding information request of the same candidate knowledge concept and the node of the expanding information request of the selected candidate knowledge concept are at the same level. If its father node's expanding information request is larger than the rank of the same candidate knowledge concept in its father node's expanding information request, step S85 will be executed; otherwise, step S87 will be executed. At step S87, i is updated, wherein i=i+1. At step S88, whether i is larger than K is determined, wherein K is the number which the candidate knowledge concepts of the selected expanding information request are in the top ranks. In the present disclosure, K can be equal to 4 as the parameter for automatically enhancing the ontology. If i is less than K, step S82 will be executed again; otherwise, step S89 will be executed. In step S89, whether any non-selected expanding information request exists is checked. If any non-selected expanding information request exists, step S81 will be executed; otherwise, the enhancement of the ontology this time is terminated.

Referring to FIG. 9, FIG. 9 is a schematic diagram showing the ranks of keywords associated with the knowledge concepts in Chinese according to an exemplary embodiment of the present disclosure. Before the ontology in FIG. 9 is enhanced, the ontology herein can be the ontology of the building information modeling as shown in FIG. 3. Furthermore, the exemplary embodiment adapts 124 papers published in the Computer Applications in Civil and Hydraulic Engineering Conference in 2011, and subtracting the articles with English contents, 117 papers in practical are used as the files of the file collection.

In the exemplary embodiment of FIG. 9, after using the expanding information request "敷地計畫" (the term in English is "site planning") to search, the table showing ranks of keywords associated with the knowledge concepts in Chinese is obtained. In the table, the top one knowledge concept "建築資訊模型" (the term in English is "building information modeling") has been added in the ontology, thus the knowledge concept "建築資訊模型" (the term in English is "building information modeling") will not be added into the ontology again, and the top two candidate knowledge concept "植栽" (the term in English is "plantation") is added into the ontology at the interior level of the knowledge concept "敷地計畫" (the term in English is "site planning").

Still take FIG. 9 as the example, the ranks of the keywords "工程分析" (the term in English is "engineering analysis") and "工地規劃與利用" (the term in English is "construction site planning and utilizing") are identical. The top one knowledge concept "建築資訊模型" (the term in English is "building information modeling") has been added in the ontology, thus the top two candidate knowledge concept "進度" (the term in English is "schedule") is selected. But the candidate knowledge concept "進度," (the term in English is "schedule") is the top one keyword of the other knowledge concept, therefore the candidate knowledge concept "進度" (the term in English is "schedule") cannot be added into the ontology at the interior level of the knowledge concept "工程分析" (the term in English is "engineering analysis").

Next, the top three candidate knowledge concept "專業分包商" is selected. Because the keyword "專業分包商" (the term in English is "professional subcontractor") are the candidate knowledge concepts of the knowledge concepts "工程分析" (the term in English is "engineering analysis") and "工地規劃與利用" (the term in English is "construction site planning and utilizing"), thus step S86 in FIG. 8 should be executed to determine whether the keyword "專業分包商" (the term in English is "professional subcontractor") belongs to the candidate knowledge concept of the knowledge concept. According to the above example, that the ranks of the candidate knowledge concepts of the knowledge concepts "工程分析" (the term in English is "engineering analysis") and "工地規劃與利用" (the term in English is "construction site planning and utilizing") in their father node's knowledge concepts should be determined. The father knowledge concepts of the knowledge concepts "工程分析" (the term in English is "engineering analysis") and "工地規劃與利用" (the term in English is "construction site planning and utilizing") are respectively "規劃與設計" (the term in English is "planning and design") and "施工" (the term in English is "construction").

In the table of FIG. 9, the rank of the keyword "專業分包商" (the term in English is "professional subcontractor") of the knowledge concept "規劃與設計" (the term in English is "planning and design") is top four, and the rank of the keyword "專業分包商" (the term in English is "professional subcontractor") of the knowledge concept "施工" (the term in English is "construction") is top three. Thus, the candidate knowledge concept "工地規劃與利用" (the term in English is "construction site planning and utilizing") is added into the ontology at the interior level of the knowledge concept "工程分析" (the term in English is "engineering analysis"), and the candidate knowledge concept which should be added into the ontology at the interior level of the knowledge concept "工地規劃與利用" (the term in English is "construction site planning and utilizing") are searched again.

The process in FIG. 8 that the candidate knowledge concepts of each searching result are selectively added into the ontology adds the knowledge concepts of the lowest expanding information request of the ontology firstly, gradually checks the selected candidate knowledge concept to determine whether the selected candidate knowledge concept is needed to be added into the ontology, and then gradually checks the candidate knowledge concepts of the superior expanding information request until all of the expanding information requests have been checked.

Assuming the files with the top three relations and the top four candidate knowledge concepts in each file are used in the candidate knowledge concepts of each searching result in FIG. 8 to enhance the ontology, the following description shows the ontology in FIG. 3 will be enhanced four times via the process of FIG. 1 and FIG. 8.

Figure 10:
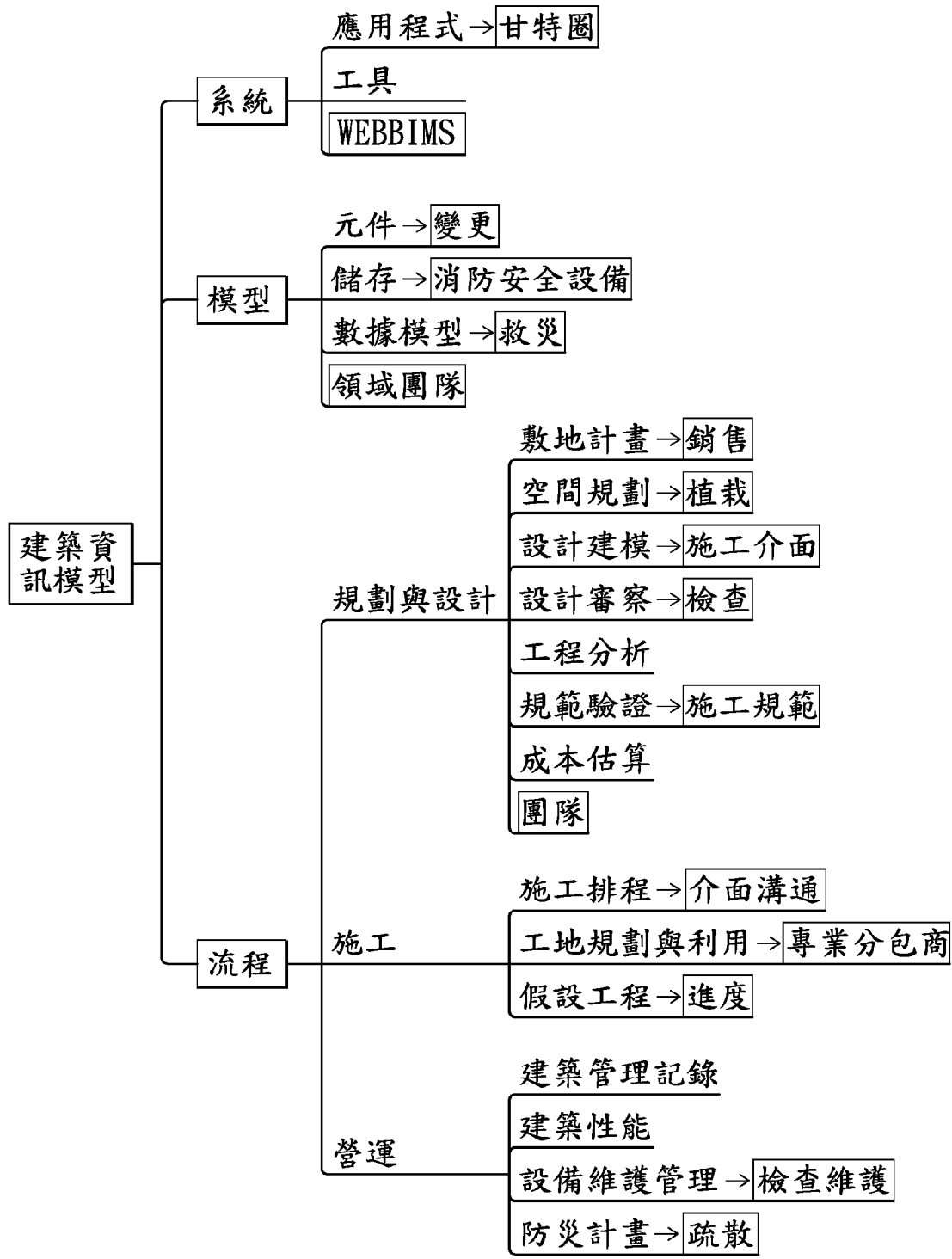
FIG. 10 is a schematic diagram illustrating the result that the ontology of the building information modeling in Chinese is first time enhanced according to an exemplary embodiment of the present disclosure.

Referring to FIG. 10, FIG. 10 is a schematic diagram illustrating the result that the ontology of the building information modeling in Chinese is first time enhanced according to an exemplary embodiment of the present disclosure. As shown in FIG. 10, compared to the original ontology, the enhanced ontology has additional level, being a structure with five levels, and 17 knowledge concepts are added. In this iteration, the added knowledge concepts are surrounded with the rectangular outlines, and added knowledge concepts are "甘特圖" (the term in English is "Gantt chart"), "WBBIMS", "變更" (the term in English is "change"), "消防安全設備" (the term in English is "fire safety equipment"), "救災" (the term in English is "disaster relieve"), "領域團隊" (the term in English is "domain team"), "銷售" (the term in English is "sale"), "植栽" (the term in English is "plantation"), "施工介面" (the term in English is "construction interface"), "檢查" (the term in English is "checking"), "施工規範" (the term in English is "construction specification"), "團隊" (the term in English is "team"), "介面溝通" (the term in English is "interface communication"), "專業分包商" (the term in English is "professional subcontractor"), "進度" (the term in English is "schedule"), "檢查維護" (the term in English is "checking and maintaining") and "疏散" (the term in English is "evacuating").

Figure 11:
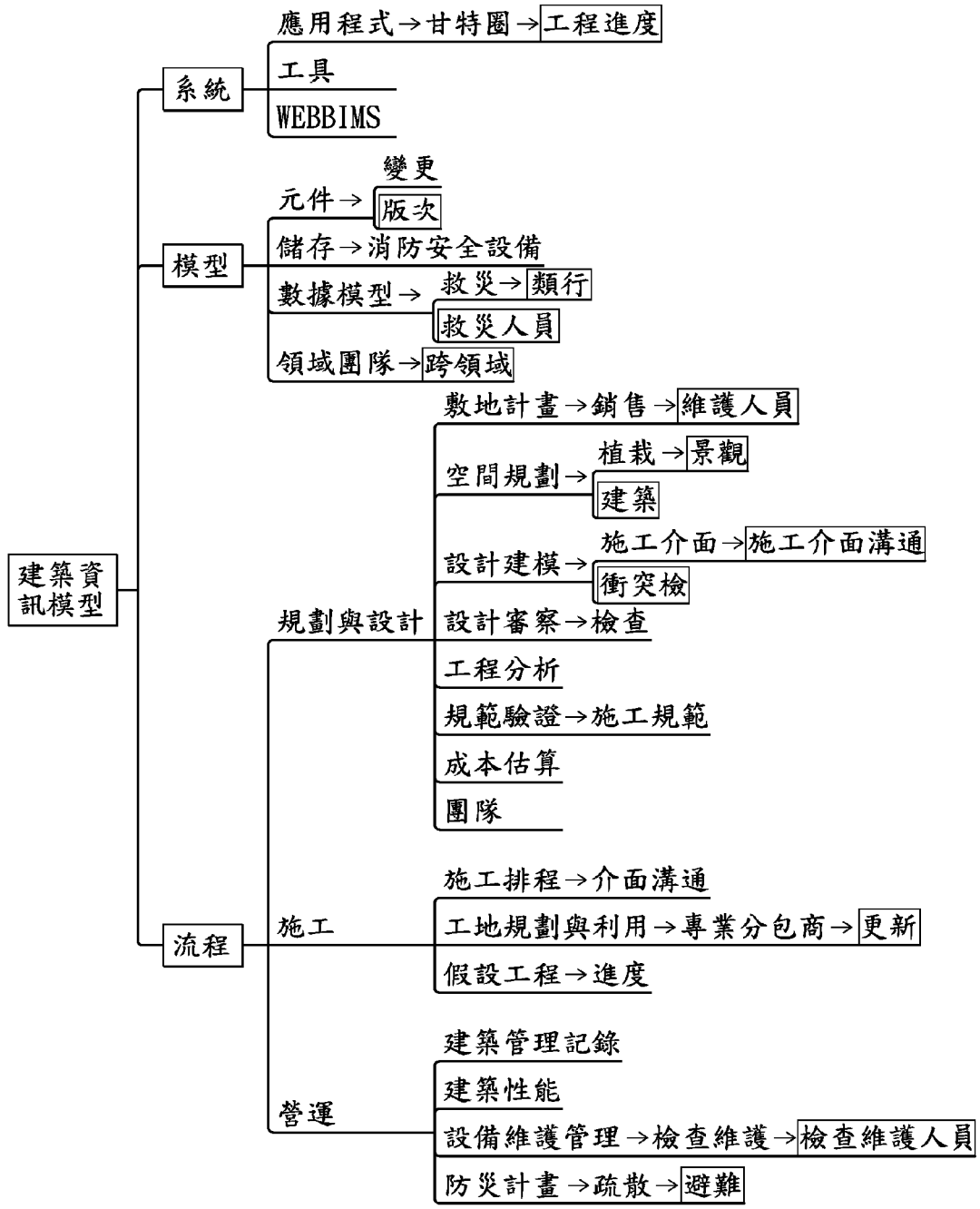
FIG. 11 is a schematic diagram illustrating the result that the ontology of the building information modeling in Chinese is second time enhanced according to an exemplary embodiment of the present disclosure.

Referring to FIG. 11, FIG. 11 is a schematic diagram illustrating the result that the ontology of the building information modeling in Chinese is second time enhanced according to an exemplary embodiment of the present disclosure. As shown in FIG. 11, based upon the first enhanced ontology of FIG. 10, the ontology is enhanced again according to the expanding information request, such that the second enhanced ontology further has additional level, being the structure with the six levels, and 13 knowledge concepts are further added. In this iteration, the added knowledge concepts are surrounded with the rectangular outlines, and added knowledge concepts are "工程進度" (the term in English is "engineering schedule"), "版次" (the term in English is "version"), "類行" (the Chinese term cannot be presented in English since Chinese term does not have the complete syntax), "救災人員" (the term in English is "disaster rescue worker"), "跨領域" (the term in English is "interdisciplinary field"), "維護人員" (the term in English is "maintainer"), "景觀" (the term in English is "landscape"), "建築" (the term in English is "building"), "施工介面溝通" (the term in English is "construction interface communication"), "衝突檢" (the Chinese term cannot be presented in English since Chinese term does not have the complete syntax), "更新" (the term in English is "updating"), "檢查維護人員" (the term in English is "person for checking and maintaining"), and "避難" (the term in English is "refuge taking"), wherein after checking the content of the file, the knowledge concept "類行" (the Chinese term cannot be presented in English since Chinese term does not have the complete syntax) is the segmentation error result of the phrase "人類行為" (the term in English is "human behavior"), and the other knowledge concept "衝突檢" (the Chinese term cannot be presented in English since Chinese term does not have the complete syntax) is the segmentation error result of the phrase "衝突檢查" (the term in English is "conflict checking").

Figure 12:
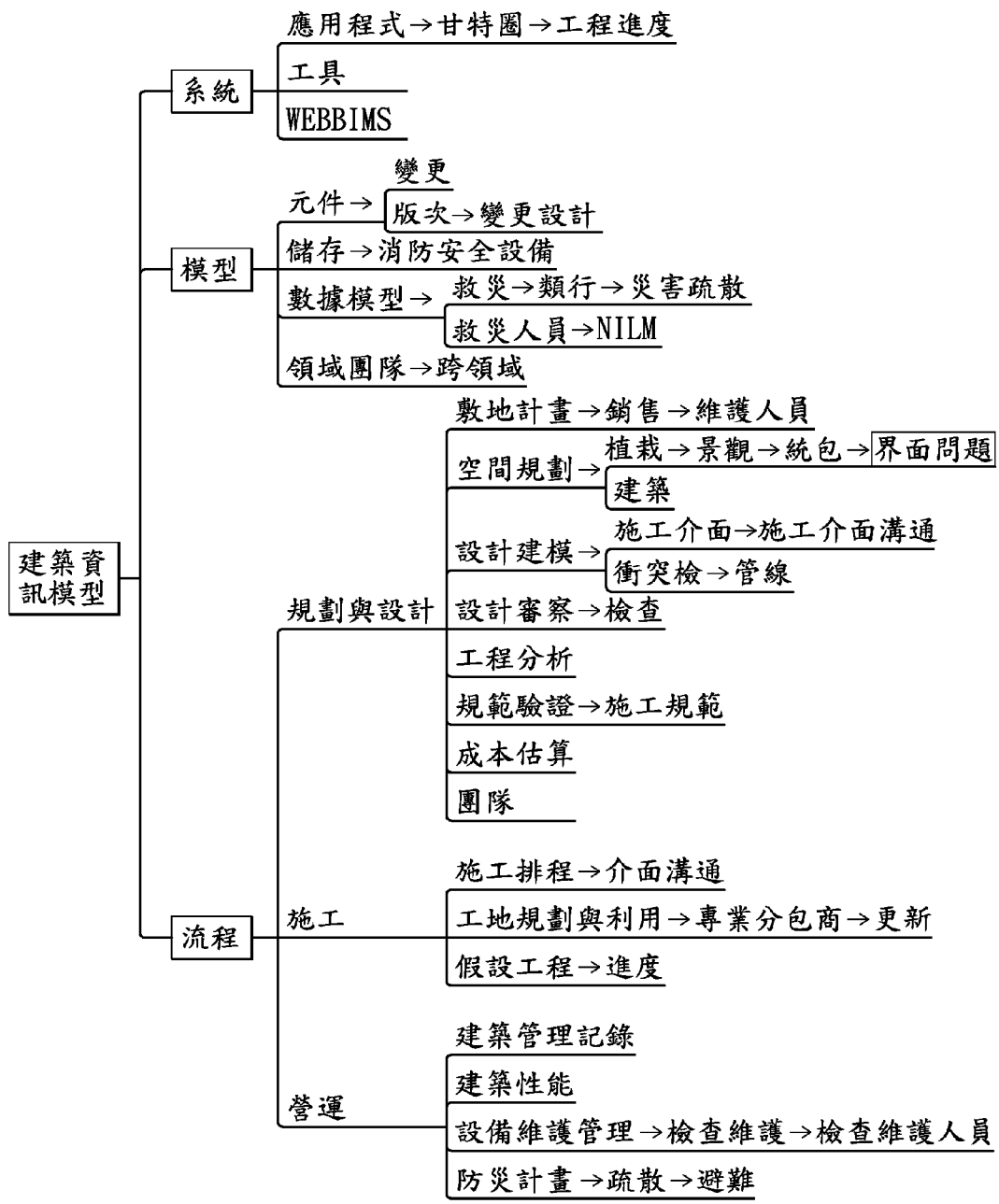
FIG. 12 is a schematic diagram illustrating the result that the ontology of the building information modeling in Chinese is fourth time enhanced according to an exemplary embodiment of the present disclosure.

Referring to FIG. 12, FIG. 12 is a schematic diagram illustrating the result that the ontology of the building information modeling in Chinese is fourth time enhanced according to an exemplary embodiment of the present disclosure. As shown FIG. 12, after this enhancement, the ontology further has additional level, being the structure with the eight levels, but merely one knowledge concept, and the added knowledge concept is "界面問題" (the term in English is "interface problem", and the added knowledge concept is surrounded with the rectangular outlines).

According to the above process for enhancing the ontology, after the input information request is expanded based upon the ontology, the files with the top N relations between the files and each expanding information request are selected, and the keywords of the N files are sorted to obtain the keyword rank table of the expanding information request. Next, whether each of the top K candidate knowledge concepts in the keyword rank table has been added into the ontology is checked. If the candidate knowledge concept is not added into the ontology, the candidate knowledge concept is added into the ontology. If the top K candidate knowledge concepts in the keyword rank table have been added into the ontology, the ontology enhancement method is terminated, and the enhanced ontology is output.

In the above ontology enhancing process, if the added knowledge concept is the phrase due to the error segmentation result, or the added knowledge concept in the ontology is not proper, as mentioned above, the user can modify the enhanced ontology via the user interface to maintain the correctness of the ontology.

Figure 13:
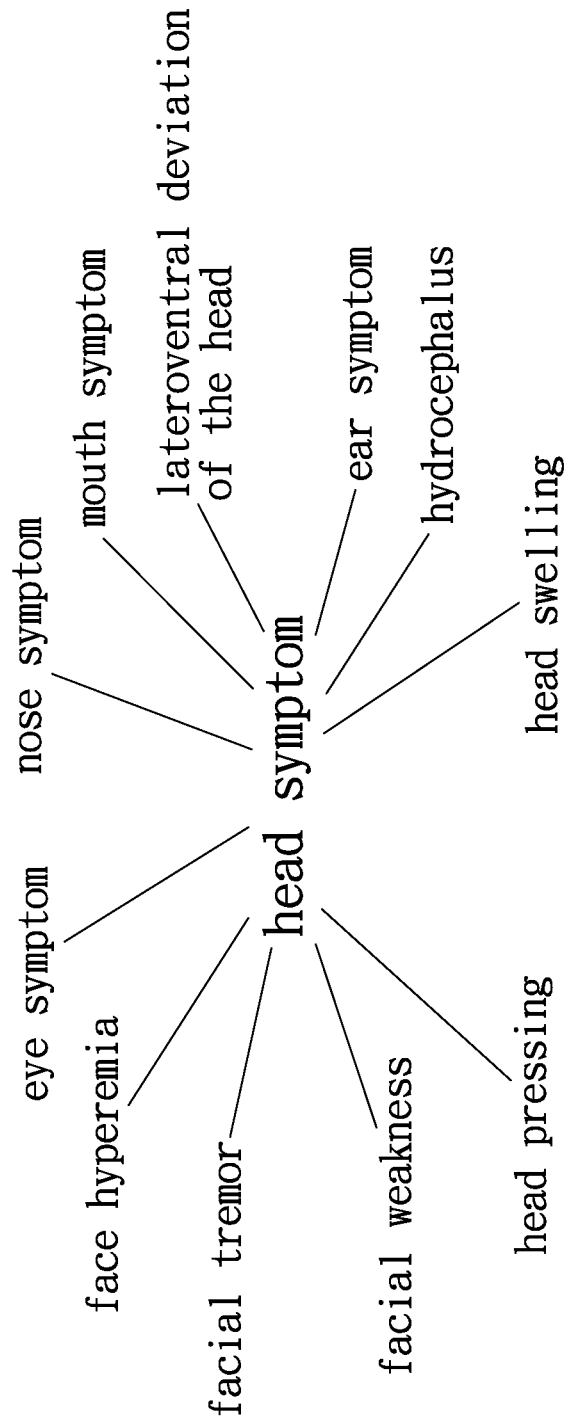
FIG. 13 is schematic diagram showing an ontology of an environmental material in Chances according to an exemplary embodiment of the present disclosure.

Referring to FIG. 13, FIG. 13 is schematic diagram showing an ontology of an head symptom according to an exemplary embodiment of the present disclosure. The ontology of the head symptom defines the related concepts of the head symptom and the relations between these concepts. According to the input information request of the user, the knowledge concepts of the ontology related to the input information request are searched to obtain the expanding information request. As shown in FIG. 13, when the user search "ear symptom", the ontology is searched, and the knowledge concept "head symptom" is obtained as one of the expanding information requests. In the exemplary embodiment, the file collection contains files related to the disease, the relations between the processed files and the expanding information requests (such as "ear symptom" and "head symptom") are calculated via the searching model, so as to find the files with higher relations.

In the exemplary embodiment, the Google searching engine is used as the searching model. The searching result is the Google search result, so as to obtain the searching result related to the "ear symptom". Next, the candidate knowledge concepts are extracted from the files within top ranks of the searching result. For the searching result of each expanding information request, the candidate knowledge concepts are extracted in the files with higher ranks in the searching result, and the candidate knowledge concepts are sorted. Next, whether candidate knowledge concepts within the higher ranks have been existed in the original ontology is checked. If the candidate knowledge concept does not exist in the original ontology, the candidate knowledge concept is added into the ontology.

Figure 14:
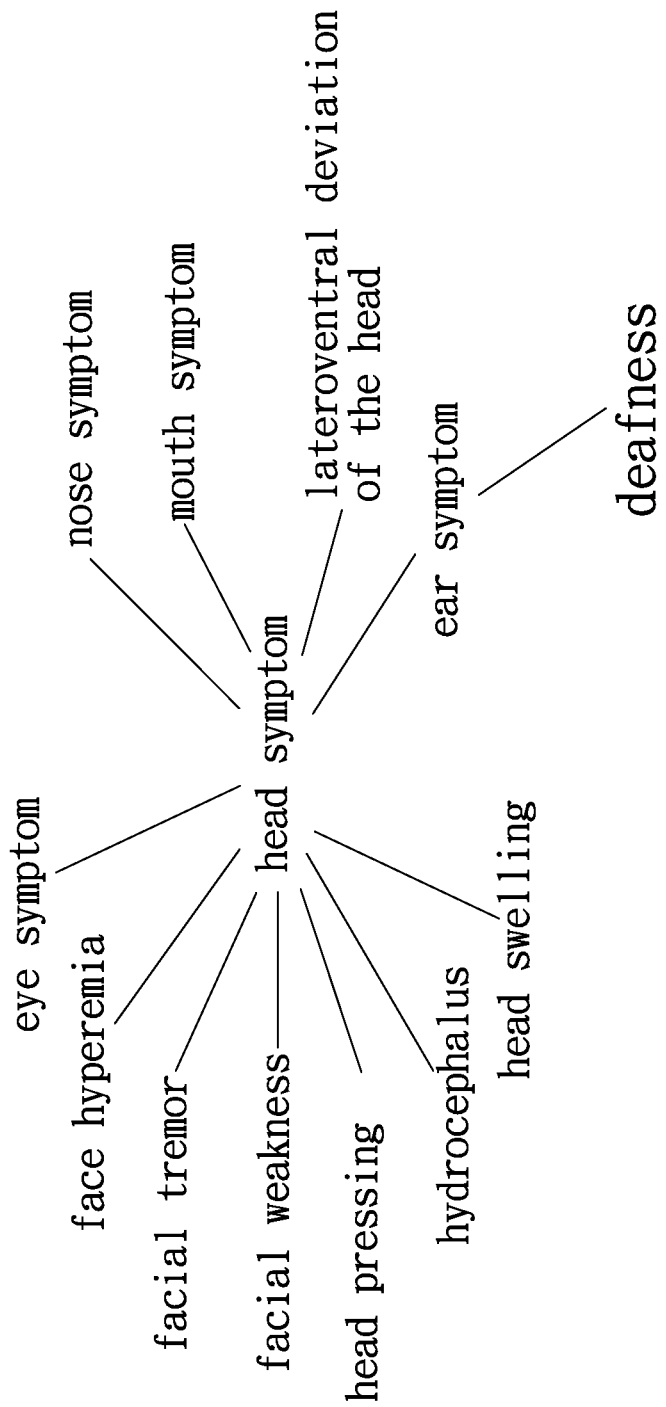
FIG. 14 is a schematic diagram illustrating the result that the ontology of the environmental material in Chinese is enhanced according to an exemplary embodiment of the present disclosure.

Referring to FIG. 14, FIG. 14 is a schematic diagram illustrating the result that the ontology of the head symptom is enhanced according to an exemplary embodiment of the present disclosure. In the exemplary embodiment, after analyzing the candidate knowledge concepts in the files, an important knowledge concept "deafness" is found, and the current ontology does not have the knowledge concept, therefore the knowledge concept "deafness" is added at interior level of the knowledge concept "ear symptom".

To sum up, the ontology enhancement method provided by the exemplary embodiment of the present disclosure can expand the input information request input by the user based upon the current ontology, and utilize the information querying technology to obtain the required enhanced knowledge concepts fast and accurately. Thus, the ontology enhancement method and system thereof can reduce the cost of time and human labor when the ontology of the specific field is established. In addition, the ontology enhancement method provided by the exemplary embodiment of the present disclosure provides the user interface to the user, such that the user can determine whether the enhanced ontology should be further enhanced or modified to increase the correctness and completeness of the ontology.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. An ontology enhancement method, comprising:
   step A: receiving at least an input information request;
   step B: based on a base ontology, expanding each input information request to produce at least an expanded information request of each corresponding input information request;
   step C: based on a searching model, according to each expanded information request, searching a file collection to obtain searching results of each corresponding expanded information request;
   step D: according to each searching result, extracting a plurality of candidate knowledge concepts of each corresponding searching result; and
   step E: selectively adding the candidate knowledge concepts of each searching result into the base ontology to enhance the base ontology, wherein the base ontology being enhanced is denoted as an enhanced ontology;
   wherein the step E comprises:

step E1: selecting a lowest non-selected one from the expanding information requests;

step E2: selecting an $i^{th}$ one of the candidate knowledge concepts of the expanding information request, wherein an initial value of i is 1;

step E3: checking whether the selected candidate knowledge concept has been added in the base ontology;

step E4: if the selected candidate knowledge concept has not been added in the base ontology, checking whether the selected candidate knowledge concept is the same as the $i^{th}$ one of the candidate knowledge concept of the other expanding information request at the same level;

step E5: if the selected candidate knowledge concept is not the same as the $i^{th}$ one of the candidate knowledge concept of the other expanding information request at the same level, adding the selected candidate knowledge concept into the base ontology, and increasing i by 1, i.e. i=i+1;

step E6: if the selected candidate knowledge concept is the same as the $i^{th}$ one of the candidate knowledge concept of the other expanding information request at the same level, checking whether a rank of the selected candidate knowledge concept in its father node's expanding information request is larger than a rank of the other same candidate knowledge concept in its father node's expanding information request, wherein a node of the expanding information request of the other same candidate knowledge concept and a node of the expanding information request of the selected candidate knowledge concept are at the same level;

step E7: if the rank of the selected candidate knowledge concept in its father node's expanding information request is larger than the rank of the other same candidate knowledge concept in its father node's expanding information request, adding the selected candidate knowledge concept into the base ontology, and increasing i by 1;

step E8: if the selected candidate knowledge concept has been added in the base ontology, increasing i by 1;

step E9: checking whether i is larger than K, wherein K is a number which the candidate knowledge concepts of the selected expanding information request are in top ranks;

step E10: if i is not larger than K, going back to execute the step E2;

step E11: if i is larger than K, going back to execute step E2, checking whether any non-selected expanding information request exists;

step E12: if at least one non-selected expanding information request exists, going back to execute the step E1; and step E13: if all of the expanding information requests have been selected, ending the step E.

2. The ontology enhancement method according to claim 1, further comprising:

step F: determining whether the enhanced ontology should be modified; and step G: when the enhanced ontology is determined to be modified, modifying the enhanced ontology.

3. The ontology enhancement method according to claim 1, further comprising:

step H: determining whether the enhanced ontology should be further enhanced; and step I: when the enhanced ontology is determined to be further enhanced, repeating step A through step E, and step H.

4. The ontology enhancement method according to claim 2, wherein an user interface is provided to at least an user to determine whether the enhanced ontology should be modified.

5. The ontology enhancement method according to claim 3, wherein an user interface is provided to at least an user to determine whether the enhanced ontology should be further enhanced.

6. The ontology enhancement method according to claim 4, wherein the user is a general user or a specific field expert, and different weighting values are assigned to the general user and the specific field expert.

7. The ontology enhancement method according to claim 5, wherein the user is a general user or a specific field expert, and different weighting values are assigned to the general user and the specific field expert.

8. The ontology enhancement method according to claim 1, wherein the searching model is a vector space searching model.

9. The ontology enhancement method according to claim 1, wherein for each searching result, an n-gram segmentation method is used to extract the candidate knowledge concepts of the corresponding searching result.

10. An ontology enhancement system, comprising:
a server, comprising:
an information request expanding module, based on a base ontology, expanding each input information request to produce at least an expanded information request of each corresponding input information request;
an information searching module, based on a searching model, according to each expanded information request, searching a file collection to obtain searching results of each corresponding expanding information request, and according to each searching result, extracting a plurality of candidate knowledge concepts of each corresponding searching result; and
an enhancement module, selectively adding the candidate knowledge concepts of each searching result into the base ontology to enhance the base ontology, wherein the base ontology being enhanced is denoted as an enhanced ontology;
wherein selectively adding the candidate knowledge concepts of each searching result into the base ontology comprises:
step E1: selecting a lowest non-selected one from the expanding information requests;
step E2: selecting an $i^{th}$ one of the candidate knowledge concepts of the expanding information request, wherein an initial value of i is 1;
step E3: checking whether the selected candidate knowledge concept has been added in the base ontology;
step E4: if the selected candidate knowledge concept has not been added in the base ontology, checking whether the selected candidate knowledge concept is the same as the $i^{th}$ one of the candidate knowledge concept of the other expanding information request at the same level;
step E5: if the selected candidate knowledge concept is not the same as the $i^{th}$ one of the candidate knowledge concept of the other expanding information request at the same level, adding the selected candidate knowledge concept into the base ontology, and increasing i by 1, i.e. i=i+1;
step E6: if the selected candidate knowledge concept is the same as the $i^{th}$ one of the candidate knowledge concept of the other expanding information request at the same level, checking whether a rank of the selected candidate knowledge concept in its father node's expanding information request is larger than a rank of the other same candidate knowledge concept in its father node's expanding information request, wherein a node of the expanding information request of the other same candidate knowledge concept and a node of the expanding information request of the selected candidate knowledge concept are at the same level;

step E7: if the rank of the selected candidate knowledge concept in its father node's expanding information request is larger than the rank of the other same candidate knowledge concept in its father node's expanding information request, adding the selected candidate knowledge concept into the base ontology, and increasing i by 1;

step E8: if the selected candidate knowledge concept has been added in the base ontology, increasing i by 1;

step E9: checking whether i is larger than K, wherein K is a number which the candidate knowledge concepts of the selected expanding information request are in top ranks;

step E10: if i is not larger than K, going back to execute the step E2;

step E11: if i is larger than K, going back to execute step E2, checking whether any non-selected expanding information request exists;

step E12: if at least one non-selected expanding information request exists, going back to execute the step E1; and step E13: if all of the expanding information requests have been selected, ending selectively adding the candidate knowledge concepts of each searching result into the base ontology.

11. The ontology enhancement system according to claim 10, further comprising:

a database, being included in the server or an external database out of the server, wherein the database stores the ontology and the file collection.

12. The ontology enhancement system according to claim 10, further comprising:

an user terminal, comprising an input module for providing an user to input at least the input information request.

13. The ontology enhancement system according to claim 12, further comprising:

a network, wherein the server and the user terminal are linked to each other through the network.

14. The ontology enhancement system according to claim 10, wherein the enhancement module determines whether the enhanced ontology should be modified or further enhanced; when the enhanced ontology is determined to be modified, the enhancement module modifies the enhanced ontology; when the enhanced ontology is determined to be further enhanced, the enhancement module further enhances the enhanced ontology.

15. The ontology enhancement system according to claim 14, wherein an user interface is provided to at least an user to determine whether the enhanced ontology should be modified or further enhanced.

16. The ontology enhancement system according to claim 15, wherein the user is a general user or a specific field expert, and different weighting values are assigned to the general user and the specific field expert.

17. The ontology enhancement system according to claim 10, wherein the searching model is a vector space searching model.

18. The ontology enhancement system according to claim 10, wherein for each searching result, an n-gram segmentation method is used to extract the candidate knowledge concepts of the corresponding searching result.

* * * * *